March 23, 1948. V. J. KROBATH, JR., ET AL 2,438,122
BEARING GREASING DEVICE
Filed June 22, 1945 2 Sheets-Sheet 1
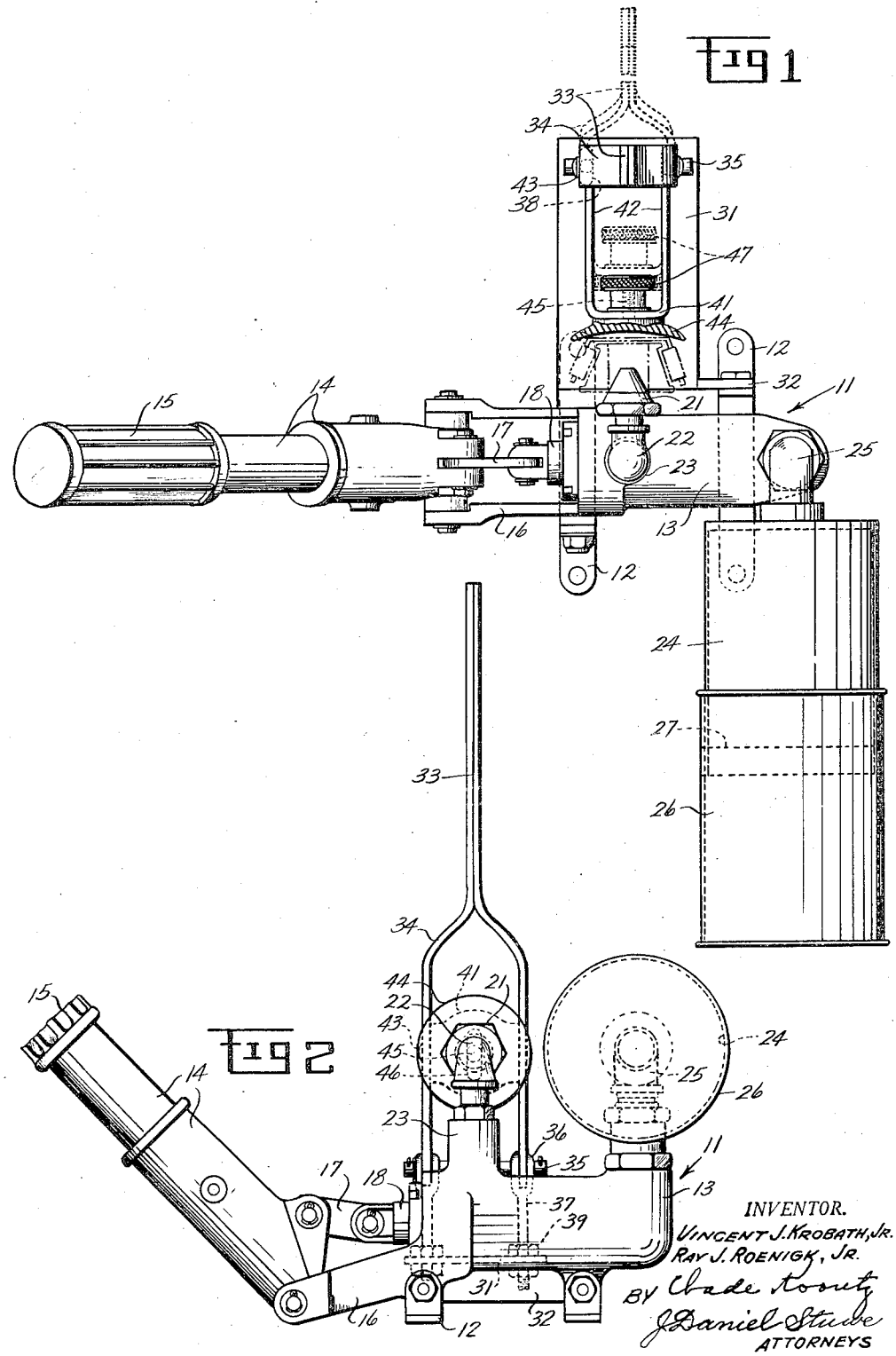
INVENTOR.
VINCENT J. KROBATH, JR.
RAY J. ROENIGK, JR.
BY
ATTORNEYS March 23, 1948.  V. J. KROBATH, JR., ET AL  2,438,122
BEARING GREASING DEVICE
Filed June 22, 1945  2 Sheets-Sheet 2
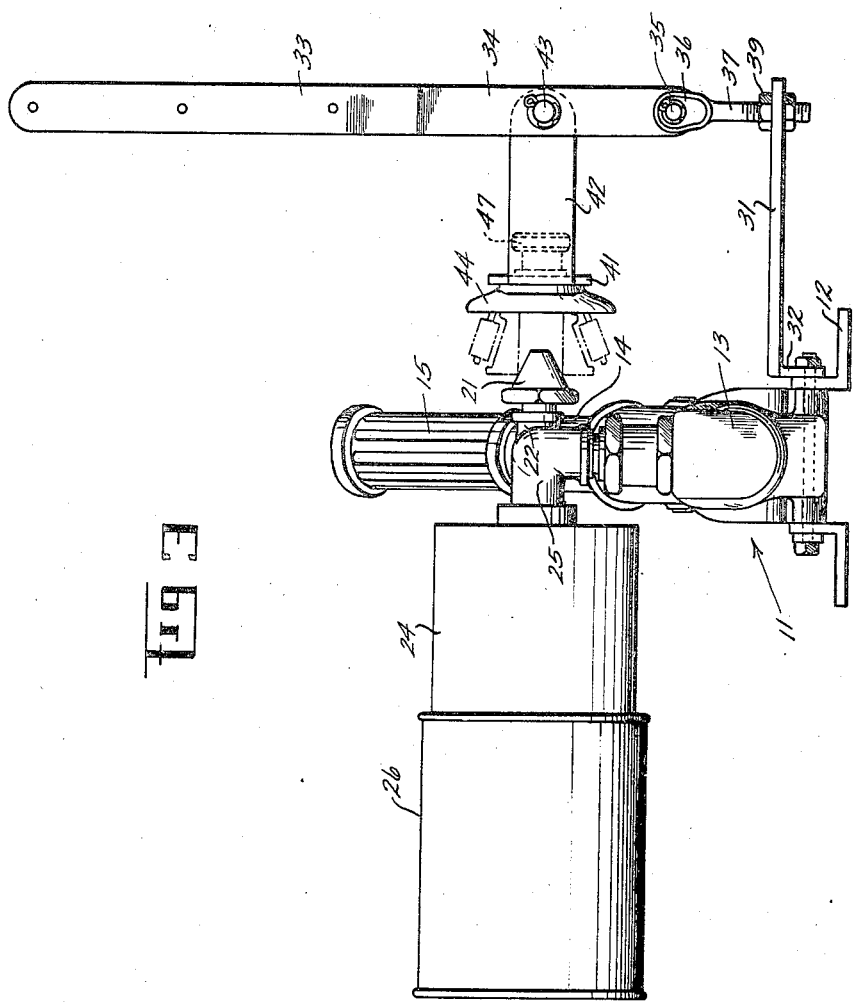
INVENTORS.
VINCENT J. KROBATH, JR.
RAY J. ROENIGK, JR.
BY Wade Koontz AND
J Daniel Stowe
ATTORNEYS Patented Mar. 23, 1948

2,438,122

UNITED STATES PATENT OFFICE 2,438,122

BEARING GREASING DEVICE

Vincent J. Krobath, Jr., St. Louis, Mo., and Ray J. Roenigk, Jr., Houston, Tex.

Application June 22, 1945, Serial No. 601,049

5 Claims. (Cl. 184—1)

(Granted under the act of March 3, 1883, as amended April 30, 1928; 370 O. G. 757)

The invention described herein may be manufactured and used by and for the Government for governmental purposes, without the payment to us of any royalty thereon.

This invention relates to a device for lubricating bearing assemblies, such as roller bearings, ball bearings, and the like.

An object of this invention is to provide a device for greasing bearings speedily by simply shifting a pair of operating members by hand, without any tedious and time consuming rotating or turning of threaded members, as is customarily required with the previously known bearing greasing devices.

A more particular object of this invention is to provide a bearing lubricator which can be very quickly operated, as by simply shifting a lever or the like a slight distance to clamp the bearing firmly in position, slightly moving the handle of a grease pump for forcefully greasing the bearing, and then slightly shifting or retracting the clamping lever to release the bearing, and in this manner greatly expediting the greasing operation and saving many man-hours of work.

Another object of this invention is to provide such a bearing greasing device which can be speedily operated and which comprises a reservoir arranged and shaped so as to have a grease can slidably mounted thereon to cooperate therewith in supplying the grease for the feed nozzle of this device.

These and various other objects and advantages are attained with this invention, as will become apparent from the following description, taken in connection with the accompanying drawing wherein the device is shown in its preferred form, it being evident that other arrangements and forms of construction may be resorted to for carrying out the objects and purposes of this invention.

In the drawings:

Fig. 1 is a plan view illustrating this invention in its preferred form of construction.

Fig. 2 is an end elevational view thereof.

Fig. 3 is a side elevational view thereof.

As illustrated in the drawing, this device for greasing or lubricating bearings comprises a pump 11 of known construction which is provided with suitable supporting means, being shown as including angle-iron feet 12 attached to the pump housing 13, whereby the device may be supported or secured on any suitable base. The pump includes a handle 14 provided with a rubber grip 15 and it is pivoted on a bracket 16 extending from the pump housing. This handle is connected through a link 17 to the outer end of an operating member 18 which is slidable in the pump for advancing the grease or lubricant in the customary manner.

A feed nozzle 21 is mounted on the pump, as by means of a coupling 22 secured on a neck 23 projecting from the pump housing 13. This nozzle 21 herein serves the dual function of a feed nozzle and also of a supporting member for holding the bearing that is to be lubricated.

A grease reservoir or lubricant container 24 is mounted on the pump 13. This reservoir is preferably in the shape of a barrel having one end connected through a coupling 25 with the pump. The opposite end of the barrel-shaped reservoir is open and is of such a form and size as to have a standard size grease can 26, which has one of its ends removed, fit slidably thereon. A sealing band 27 is placed around the open end part of the barrel to provide a fluid tight fit thereon for the can, and so that the can will slide onto the barrel by the force of suction caused by the operation of the pump.

A bracket 31, preferably in the shape of a plate, is secured to the housing 13 by an end flange 32 and extends laterally therefrom. A lever 33 is provided at its lower end with a pair of branches or forks 34 which are pivoted by a pin 35 to the eye portions 36 of bolts 37 mounted in slots 38 provided in the outer end of said bracket plate 31, adapted to adjust the lever toward and away from the nozzle, locknuts 39 securing the bolts in place. A U-shaped extension or yoke 41 has the outer ends of its legs 42 pivoted by rivets 43 between said forks 34, and the bight of the yoke carries a grease deflecting member 44, said member being preferably in the form of a rubber cup or dished seat mounted adjustably and removably on said yoke 41, as by means of a stem 45 on the cup being adjustable vertically in a slot 46 provided in the yoke and being removably held in place by a knurled nut 47 threaded on said stem.

The dished deflecting member 44 cooperates with nozzle 21 to clamp a bearing in position therebetween, as the lever 33 is held in its clamping position while operating the pump lever 14. This member 44 is also readily removable by actuating the nut 47, so that said member can be replaced by one of different size to better suit different sized bearings, if found desirable.

In operating this device, it is merely necessary to place the bearing which is to be greased upon the nozzle 21, that is fixed on the pump, and then engaging the bearing by the cooperating cup-shaped member 44, and clamping it in place by a slight movement of the clamping lever 33, thereby also sealing the outer apertures of the bearing. The pump lever 14 is then slightly depressed to force grease from nozzle 21 through the axial opening in the bearing, deflecting it by the rubber cup 44, back through the bearing, and thereby forcing the old grease from said bearing and packing new lubricant in its place. Sufficient suction is created by the pump during its operation to draw the grease from the can 26 into the reservoir 24 to be fed to the nozzle, and also to draw the can forward on the reservoir barrel by the feeding operation.

It is apparent from the above disclosure that with this device the job of greasing bearings can be readily and quickly performed by merely shifting slightly the clamping lever 33 and imparting a slight movement to the pump handle 14, without requiring any tedious and time consuming turning of screws or other threaded operating members, thus saving many man-hours of work.

We claim:

1. A bearing lubricator comprising a hand-operated grease pump having a reservoir mounted thereon which has an opening at one end to facilitate mounting a grease can with an open end slidably upon said reservoir end to supply grease automatically to the reservoir by operation of said pump, a nozzle mounted stationary on the pump for receiving grease therefrom and serving as a feed nozzle as well as a bearing holding member, and a manually actuated member and means movably supporting the member adjacent the pump, said member carrying a seat thereon between which seat and nozzle the bearing is clamped in position, said member and said seat being readily movable in one direction toward the nozzle and likewise in the opposite direction away from the nozzle to facilitate quick mounting and dismounting of the bearing and also serving for clamping the bearing in place during lubrication.

2. A bearing lubricator comprising a hand-operated pump, a reservoir mounted on the pump, a nozzle connected with the pump to be fed from the reservoir by operation of the pump, said reservoir containing a portion for supporting a lubricant container thereon and having an opening to receive lubricant therefrom, a pivoted lever associated with the pump, a member on said lever extending therefrom toward the pump, and a grease deflecting seat adjustably and removably mounted on said extending member to cooperate with said nozzle for holding the bearing therebetween, said lever with said member and seat being mounted for quick swinging movement toward and away from the nozzle to facilitate speedy mounting and dismounting of the bearing.

3. A bearing lubricator comprising supporting means, a hand-operated pump supported on said means, a reservoir mounted on the pump, a nozzle on the pump and fed from the reservoir by operation of said pump, said reservoir including a barrel portion open at its end and being constructed to have a grease containing can with an open end mounted to slide inwardly on said barrel portion by the force of suction during operation of the pump, a lever and means for pivoting it on said supporting means, and a cup-shaped seat carried by the lever to cooperate with said nozzle for holding a bearing in place, said lever with the seat thereon being arranged for quick swinging movement toward and away from the nozzle and for clamping the bearing in place while greasing it to facilitate speedy mounting and greasing and dismounting of the bearing.

4. A bearing lubricator comprising a hand-operated pump, a reservoir mounted on the pump, a nozzle on the pump and fed from the reservoir by operation of the pump, said reservoir containing a portion for supporting a lubricant container to supply lubricant to the reservoir, a bracket associated with the pump, a lever mounted on the bracket to be adjustable toward and away from the pump, and a dished grease-deflecting seat mounted on said lever to be readily adjustable and removable and to cooperate with said nozzle for holding the bearing therebetween, said lever with said seat being mounted for quick swinging movement toward and away from the nozzle to facilitate speedy mounting and dismounting of the bearing.

5. A bearing lubricator comprising supporting means and a hand-operated pump thereon, a reservoir mounted on the pump, a nozzle on the pump and fed from the reservoir by operation of said pump, said reservoir including a barrel portion open at its outer end and shaped to have a standard grease containing can with an open end mounted to slide inwardly on said barrel portion by the force of suction during operation of the pump, a bracket on said supporting means extending laterally from the pump, a lever pivoted on said bracket, a yoke on the lever and extending toward the pump, and a grease deflecting seat on the yoke to cooperate with said nozzle for holding a bearing in place, said seat being adjustably and removably mounted on said yoke and said lever with the yoke and seat thereon being arranged for quick swinging movement toward and away from the nozzle to facilitate speedy mounting and greasing and dismounting of the bearing.

VINCENT J. KROBATH, JR.
RAY J. ROENIGK, JR.

REFERENCES CITED

The following references are of record in the file of this patent:

UNITED STATES PATENTS

| Number | Name | Date |
|---|---|---|
| 1,896,507 | Battle | Feb. 7, 1933 |
| 1,975,313 | Creveling | Oct. 2, 1934 |
| 2,140,909 | Green | Dec. 20, 1938 |
| 2,178,816 | Sibley | Nov. 7, 1939 |
| 2,248,940 | Berg | July 15, 1941 |
| 2,396,124 | Pitisci | Mar. 5, 1946 |